(12) United States Patent
Liu et al.

(10) Patent No.: US 10,494,477 B2
(45) Date of Patent: Dec. 3, 2019

(54) PRODUCTION METHOD OF POLY(CARBONATE-ETHER)POLYOL

(71) Applicant: Changchun Institute of Applied Chemistry Chinese Academy of Sciences, Changchun (CN)

(72) Inventors: Shunjie Liu, Changchun (CN); Yusheng Qin, Changchun (CN); Xianhong Wang, Changchun (CN); Lijun Qiao, Changchun (CN); Fosong Wang, Changchun (CN)

(73) Assignee: Changchun Institute of Applied Chemistry Chinese Academy of Sciences, Changchun (CN)

( * ) Notice: Subject to any disclaimer, the term of this patent is extended or adjusted under 35 U.S.C. 154(b) by 98 days.

(21) Appl. No.: 15/749,414

(22) PCT Filed: Dec. 10, 2015

(86) PCT No.: PCT/CN2015/096978
§ 371 (c)(1),
(2) Date: Jan. 31, 2018

(87) PCT Pub. No.: WO2017/020470
PCT Pub. Date: Feb. 9, 2017

(65) Prior Publication Data
US 2018/0215869 A1    Aug. 2, 2018

(30) Foreign Application Priority Data
Aug. 4, 2015  (CN) .......................... 2015 1 0470795

(51) Int. Cl.
*C08G 64/34*    (2006.01)
*B01J 23/80*    (2006.01)
(Continued)

(52) U.S. Cl.
CPC .............. *C08G 64/34* (2013.01); *B01J 23/80* (2013.01); *C08K 3/28* (2013.01); *C08L 69/00* (2013.01)

(58) Field of Classification Search
CPC ....................................................... C08G 64/34
(Continued)

(56) References Cited

U.S. PATENT DOCUMENTS 4,826,887 A    5/1989  Kuyper et al.
2008/0051554 A1  2/2008  Coates et al.

FOREIGN PATENT DOCUMENTS

| CN | 102432857 A | 5/2012 |
| CN | 102617844 A | 8/2012 |
| CN | 105061746 A | 11/2015 |

OTHER PUBLICATIONS

CN 102617844 A translation (Year: 2012).*

* cited by examiner

*Primary Examiner* — Duc Truong
(74) *Attorney, Agent, or Firm* — Cesari and McKenna LLP

(57) ABSTRACT

This invention provides a production method of a poly(carbonate-ether)polyol, comprising the steps of: performing a reaction between a carboxylic acid and an epoxide to obtain an intermediate, wherein the carboxylic acid has an acidity constant of 0.2 to 4; and performing a polymerization reaction between the intermediate and carbon dioxide under the action of a rare earth doped double metal cyanide of $Zn_3[Co(CN)_6]_2$ to obtain a poly(carbonate-ether)polyol. In the production method of the poly(carbonate-ether)polyol provided by this invention, a carboxylic acid having a suitable acidity constant is used as an initiator and an epoxide is firstly activated by using the carboxylic acid, and polyethers having different molecular weights generated in (Continued)

situ after activation are used as chain transfer agents to be involved in the polymerization reaction between carbon dioxide and the epoxide under the action of a rare earth doped double metal cyanide $Zn_3[Co(CN)_6]_2$. This production method of the poly(carbonate-ether)polyol has a shorter reaction time, and the content of a byproduct propylene carbonate in the product is relatively low.

14 Claims, 2 Drawing Sheets

(51) Int. Cl.
  *C08K 3/28* (2006.01)
  *C08L 69/00* (2006.01)
(58) Field of Classification Search
  USPC .................................................. 528/412, 414
  See application file for complete search history.

PRODUCTION METHOD OF POLY(CARBONATE-ETHER)POLYOL

CROSS-REFERENCE TO RELATED APPLICATIONS

This application is the National Stage of International Application No. PCT/CN2015/096978, filed Dec. 10, 2015, which claims the benefit of Chinese Application No. 201510470795.7, filed on Aug. 4, 2015. The contents of both applications are hereby incorporated by reference in their entirety.

FIELD OF THE INVENTION

This invention relates to the technical field of polymers, and particularly to a production method of a poly(carbonate-ether)polyol.

BACKGROUND OF THE INVENTION

Carbon dioxide is a kind of greenhouse gas, while it can be utilized as a resource of carbon and oxygen. How to highly efficiently utilize the carbon dioxide resource has already become a hot spot in current studies. At present, methods for producing poly(carbonate-ether)polyols by using a double metal cyanide (DMC) as a catalyst and using carbon dioxide and an epoxide as raw materials have been widely reported. Kuyper (U.S. Pat. Nos. 4,826,887, 4,826,953), Hinz (U.S. Pat. No. 6,173,599B1), etc., have reported methods for producing poly(carbonate-ether)polyols by using a polypropylene glycol having a low molecular weight as an initiator, a $Zn_3[Co(CN)_6]_2$-based double metal cyanide as a catalyst, and carbon dioxide and propylene oxide as raw materials. However, by producing a poly(carbonate-ether)polyol by using the catalytic system described above, the polymerization reaction is performed at a temperature of 110° C. or higher in order to pursue a relatively high reactivity. In this way, it unavoidably results in a very low content of carbonate units (<20%) and a very high content of the byproduct propylene carbonate (>20%). The generation of the byproduct not only wastes production raw materials, but also increases the cost for separation. However, the reaction time will be greatly elongated by improving the content of carbonate units in the poly(carbonate-ether)polyol via a simple cooling method, and the requirement for production is not met.

Therefore, a method of producing a poly(carbonate-ether) polyol which has a short reaction time and generates less byproduct propylene carbonate is in urgent need at present.

SUMMARY OF THE INVENTION

In view of this, an object of this invention is to provide a production method of a poly(carbonate-ether)polyol. The time of the method for producing a poly(carbonate-ether) polyol provided by this invention is relatively short, and the content of the byproduct propylene carbonate in the poly (carbonate-ether)polyol produced is relatively low.

This invention provides a production method of a poly (carbonate-ether)polyol, comprising the steps of:

performing a reaction between a carboxylic acid and an epoxide to obtain an intermediate, wherein the carboxylic acid has an acidity constant of 0.2 to 4; and performing a polymerization reaction between the intermediate and carbon dioxide under the action of a rare earth doped double metal cyanide of $Zn_3[Co(CN)_6]_2$ to obtain a poly(carbonate-ether)polyol, wherein the rare earth doped double metal cyanide of $Zn_3[Co(CN)_6]_2$ is produced from a rare earth salt compound, a zinc salt compound, $K_3[Co(CN)_6]$, and tert-butanol.

Preferably, the acidity constant of the carboxylic acid is 1 to 3.

Preferably, the epoxide comprises one or more selected from the group of alkylene oxide compounds, cycloalkylene oxide compounds, and epoxy ether compounds having a carbon atom number of 2 to 20.

Preferably, the epoxide comprises one or more selected from the group of propylene oxide, ethylene oxide, butylene oxide, polystyrene oxide, cyclopentene oxide, cyclohexene oxide, epoxy chloropropane, glycidyl ether, 1,2-butylene oxide, 1,2-hexene oxide, 1,2-octene oxide, 1,2-decene oxide, 1,2-dodecene oxide, 1,2-tetradecene oxide, and 1,2-hexadecene oxide.

Preferably, the reaction between the carboxylic acid and the epoxide is performed at a temperature of 40° C. to 150° C.

Preferably, the reaction between the carboxylic acid and the epoxide is performed for a time of t, wherein 0<t≤200 min.

Preferably, a mass ratio of the carboxylic acid to the epoxide is 1:(10 to 30).

Preferably, the polymerization reaction is performed under a pressure of 2 MPa to 5 MPa.

Preferably, the pressure for the polymerization reaction is controlled by adjusting the usage amount of carbon dioxide.

Preferably, the polymerization reaction is performed at a temperature of 20° C.-120° C.

Preferably, a mass ratio of the rare earth doped double metal cyanide of $Zn_3[Co(CN)_6]_2$ to the epoxide is 1:(1300 to 2500).

Preferably, the carboxylic acid comprises one or more selected from the group of trifluoroacetic acid, oxalic acid, 2-propiolic acid, maleic acid, phosphoric acid, 1,3,5-benzenetricarboxylic acid, pyruvic acid, malonic acid, monochloroacetic acid, monobromoacetic acid, phthalic acid, salicylic acid, tartaric acid, monoiodoacetic acid, nitrous acid, and aspartic acid.

Preferably, the polymerization reaction is performed for a time of 4 hours to 6 hours.

Preferably, the produced poly(carbonate-ether)polyol comprises a byproduct propylene carbonate having a content of 4.7% to 8.3% by mass.

In the production method of the poly(carbonate-ether) polyol provided by this invention, a carboxylic acid having a acidity constant of 0.2 to 4 is used as an initiator and an epoxide is firstly activated by using the carboxylic acid, and polyethers having different molecular weights generated in situ after the activation are used as a chain transfer agent to be involved in the polymerization reaction between carbon dioxide and the epoxide under the action of a rare earth doped double metal cyanide of $Zn_3[Co(CN)_6]_2$ to produce a polycarbonate. The epoxide is firstly activated by using the carboxylic acid having a suitable acidity constant, wherein the interaction between the carboxylic acid and the active center of the rare earth doped double metal cyanide of $Zn_3[Co(CN)_6]_2$ is relatively weak, and is directly involved in copolymerization in the form of a chain transfer agent after activation, such that the induction period of the polymerization reaction is relatively short and the time for the polymerization reaction is thereby reduced. Furthermore, after the preliminary activation of the carboxylic acid having a suitable acidity constant and the epoxide, hydrogen protons in the carboxylic acid will not substitute the growing polymer chain from the active center so as to catalyze the back-biting reaction and thus the generation of the byproduct propylene carbonate can be reduced. Therefore, by activating the carboxylic acid and the epoxide via a preliminary reaction, the production method of the poly(carbonate-ether)polyol provided by this invention has a relatively short reaction time, and the content of the byproduct propylene carbonate in the poly(carbonate-ether)polyol produced is relatively low. It is indicated by experimental results that the copolymerization reaction time of the production method of the poly(carbonate-ether)polyol provided by this invention is 4 hours to 6 hours and the content of the byproduct propylene carbonate in the poly(carbonate-ether)polyol produced is 4.7% to 8.3% by mass.

BRIEF DESCRIPTION OF THE DRAWINGS

In order to illustrate the technical solutions in embodiments of this present invention or in the prior art more clearly, the figures required for describing the embodiments or the prior art will be simply introduced below. It is apparent that the figures described below are merely embodiments of this invention, and other figures may be further obtained by those of ordinary skill in the art according to the figures provided without exerting inventive work.

DETAILED DESCRIPTION OF THE INVENTION

Figure 1:
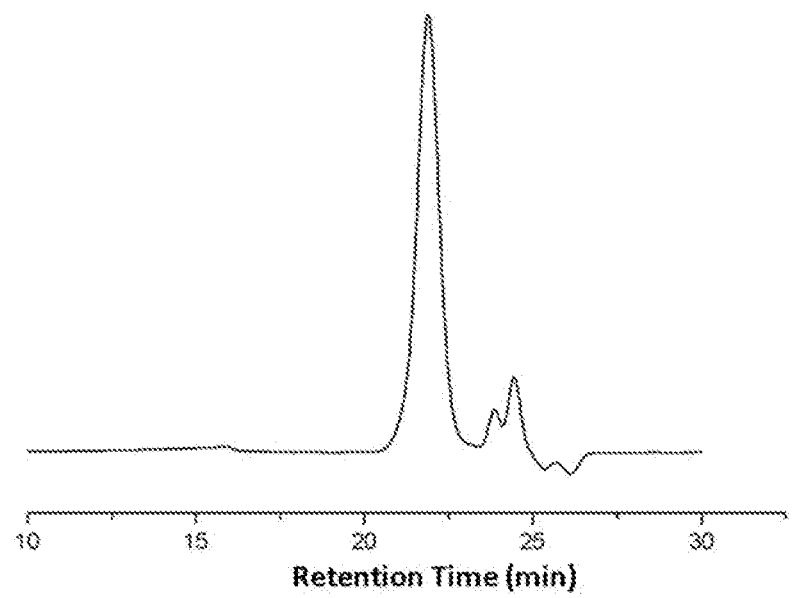
FIG. 1 is a chromatogram of gel permeation chromatography of the poly(carbonate-ether)polyol produced in Example 3 of this invention.

The technical solutions in the embodiments of this invention will be described clearly and fully below in conjunction with accompanying drawings in embodiments of this invention. Obviously, the embodiments described are merely a part of the embodiments of this invention, rather than all of the embodiments. Based on the embodiments in this invention, all other embodiments obtained by those of ordinary skill in the art without performing inventive work belong to the scope protected by this invention.

This invention provides a production method of a poly(carbonate-ether)polyol, comprising the steps of:

performing a reaction between a carboxylic acid and an epoxide to obtain an intermediate, wherein the carboxylic acid has an acidity constant of 0.2 to 4; and performing a polymerization reaction between the intermediate and carbon dioxide under the action of a rare earth doped double metal cyanide of $Zn_3[Co(CN)_6]_2$ to obtain a poly(carbonate-ether)polyol, wherein the rare earth doped double metal cyanide of $Zn_3[Co(CN)_6]_2$ is produced from a rare earth salt compound, a zinc salt compound, $K_3[Co(CN)_6]$, and tert-butanol.

In this invention, a reaction between a carboxylic acid and an epoxide is performed to obtain an intermediate; and the acidity constant of the carboxylic acid is 0.2 to 4. In an embodiment of this invention, the temperature for the reaction between the carboxylic acid and the epoxide is 40° C. to 150° C. In another embodiment, the temperature for the reaction between the carboxylic acid and the epoxide is 60° C. to 120° C. In a further embodiment, the temperature for the reaction between the carboxylic acid and the epoxide is 80° C. to 100° C.

In an embodiment of this invention, the time for the reaction between the carboxylic acid and the epoxide is t, wherein $0<t\leq 200$ min. In another embodiment, the time for the reaction between the carboxylic acid and the epoxide is 5 min to 180 min. In a further embodiment, the time for the reaction between the carboxylic acid and the epoxide is 10 min to 150 min.

In an embodiment of this invention, the reaction between the carboxylic acid and the epoxide is may be performed under the condition of stirring. In an embodiment of this invention, the speed of the stirring is 400 rpm to 600 rpm. In another embodiment, the speed of the stirring is 450 rpm to 550 rpm. In a further embodiment, the speed of the stirring is 480 rpm to 520 rpm.

In this invention, the acidity constant of the carboxylic acid is 0.2 to 4. In an embodiment of this invention, the acidity constant of the carboxylic acid is 1 to 3. In another embodiment, the acidity constant of the carboxylic acid is 1.2 to 2.5. In a further embodiment, the acidity constant of the carboxylic acid is 1.5 to 2. In an embodiment of this invention, the carboxylic acid includes trifluoroacetic acid (the acidity constant is 0.23), oxalic acid (the acidity constant is 1.27), 2-propiolic acid (the acidity constant is 1.89), maleic acid (the acidity constant is 1.92), phosphoric acid (the acidity constant is 2.12), 1,3,5-benzenetricarboxylic acid (the acidity constant is 2.12), pyruvic acid (the acidity constant is 2.49), malonic acid (the acidity constant is 2.83), monochloroacetic acid (the acidity constant is 2.86), monobromoacetic acid (the acidity constant is 2.86), phthalic acid (the acidity constant is 2.95), salicylic acid (the acidity constant is 2.98), tartaric acid (the acidity constant is 3.04), monoiodoacetic acid (the acidity constant is 3.21), nitrous acid (the acidity constant is 3.29), or aspartic acid (the acidity constant is 3.9).

In an embodiment of this invention, the mass ratio of the carboxylic acid to the epoxide is 1:(10 to 30). In another embodiment, the mass ratio of the carboxylic acid to the epoxide is 1:(15 to 25). In a further embodiment, the mass ratio of the carboxylic acid to the epoxide is 1:(18 to 22).

After the intermediate is obtained, a polymerization reaction between the intermediate and carbon dioxide is performed under the action of a rare earth doped double metal cyanide of $Zn_3[Co(CN)_6]_2$ to obtain a poly(carbonate-ether)polyol. In an embodiment of this invention, the pressure for the polymerization reaction is 2 MPa to 5 MPa. In another embodiment, the pressure for the polymerization reaction is 3 MPa to 4 MPa. In an embodiment of this invention, the temperature for the polymerization reaction is 20° C. –120° C. In another embodiment, the temperature for the polymerization reaction is 50° C. –100° C. In an embodiment of this invention, the time for the polymerization reaction may be 4 hours to 6 hours. In an embodiment of this invention, carbon dioxide may be introduced into the intermediate, and the pressure for the polymerization reaction is controlled by adjusting the usage amount of carbon dioxide.

In this invention, the rare earth doped double metal cyanide of $Zn_3[Co(CN)_6]_2$ is produced from a rare earth salt compound, a zinc salt compound, $K_3[Co(CN)_6]$, and tert-butanol. In this invention, the source of the rare earth doped double metal cyanide of $Zn_3[Co(CN)_6]_2$ is not particularly limited, and it may be produced according to the production method of the rare earth doped $Zn_3[Co(CN)_6]_2$-based double metal cyanide disclosed in Chinese Patent Application No. 201210086834.X.

In an embodiment of this invention, the mass ratio of the rare earth doped double metal cyanide of $Zn_3[Co(CN)_6]_2$ to the epoxide is 1:(1300 to 2500). In another embodiment, the mass ratio of the rare earth doped double metal cyanide of $Zn_3[Co(CN)_6]_2$ to the epoxide is 1:(1500 to 2300). In a further embodiment, the mass ratio of the rare earth doped double metal cyanide of $Zn_3[Co(CN)_6]_2$ to the epoxide is 1:(1800 to 2200).

A poly(carbonate-ether)polyol is produced by using the production method provided by this invention, wherein the time for the polymerization reaction is 4 hours to 6 hours, and the production time is relatively short.

The poly(carbonate-ether)polyol produced by the method provided by this invention is subjected to a detection of gel permeation chromatography and a detection of nuclear magnetic resonance. As results of detections, the content of the byproduct propylene carbonate in the poly(carbonate-ether) polyol produced by the method provided by this invention is 4.7% to 8.3% by mass.

In this invention, the raw materials used in the Examples below are all commercially available products.

EXAMPLE 1

0.78 g of $YCl_3$ and 11.42 g of $ZnCl_2$ were dissolved in a mixed solution formed from 60 mL of deionized water and 30 mL of tert-butanol. The mixed solution was heated to 50° C. and constant temperature was maintained for 20 min. A mixed solution formed from 1.32 g of analytically pure $K_3[Co(CN)_6]$ and 20 mL of deionized water was dropped into the solution described above by using a peristaltic pump at a stirring speed of 300 rpm. Liquid feeding spent 45 min, and a reaction was performed at 50° C. After the completion of dropping, stirring was continued at 50° C. for 1 h to obtain a suspension.

The suspension was subjected to centrifugal separation with a centrifuge at a speed of 5000 rpm for 10 min. The separated clear liquid was decanted, and the deposit was sequentially subjected to chemical slurry washing for 5 times by respectively using a 60 mL mixed solution of tert-butanol and water at 50° C. and was finally subjected to chemical slurry washing once by using tert-butanol. The volume ratios of tert-butanol to water in the mixed solution of tert-butanol and water were 30/30, 36/24, 42/18, 48/12, 54/6, respectively. The stirring speed of chemical slurry washing was 300 rpm. The time of each chemical slurry washing was 10 min. The suspension after each chemical slurry washing was subjected to centrifugal separation with a centrifuge, and the speed of centrifugation was 5000 rpm and the time of centrifugal separation was 10 min. The deposit after chemical slurry washing was dried under vacuum at 50° C. for 10 h, and was further dried under vacuum at 50° C. to constant weight after grinding and sieving, so as to obtain a rare earth doped double metal cyanide of $Zn_3[Co(CN)_6]_2$, which was stored under the protection of carbon dioxide gas.

EXAMPLE 2

A weighing bottle was subjected to 6 times of treatment of evacuation and inflation with $CO_2$ gas at 80° C., and the weighing bottle was cooled to room temperature. Trifluoroacetic acid was weighed by using the weighing bottle described above. An autoclave was subjected to 6 times of treatment of evacuating $CO_2$ gas at 80° C., and then cooled to room temperature. 8 g of trifluoroacetic acid was added to the autoclave described above, and 100 mL of propylene oxide was added to the autoclave. With stirring at a speed of 500 rpm, the autoclave was placed in a thermostatic bath at 70° C. for performing reaction to obtain an intermediate, wherein the time for the reaction was 5 min.

60 mg of the rare earth doped double metal cyanide of $Zn_3[Co(CN)_6]_2$ produced in Example 1 was added to the autoclave described above, and carbon dioxide was introduced into the autoclave to allow the polymerization reaction between the intermediate and carbon dioxide. The pressure for the polymerization reaction was controlled to be 4 MPa. When the pressure in the autoclave was no longer reduced, the reaction was stopped, and the autoclave was cooled to room temperature. The unreacted monomers and carbon dioxide therein were slowly discharged, and the obtained reaction product was collected and then dried in a vacuum drying oven at 40° C. to constant weight so as to obtain 117 g of a poly(carbonate-ether)polyol.

The time for the polymerization reaction in the process of the method for producing the poly(carbonate-ether)polyol provided in Example 2 of this invention was recorded. As a result of observation, the time for the polymerization reaction in the process of the method for producing the poly(carbonate-ether)polyol provided in Example 2 of this invention was 5 hours.

The poly(carbonate-ether)polyol produced in Example 2 of this invention was subjected to a detection of gel permeation chromatography and a detection of nuclear magnetic resonance. As results of detections, with respect to the poly(carbonate-ether)polyol produced in Example 2 of this invention, the number average molecular weight was 5000 g/moL, the molecular weight distribution was 1.35, the content of carbonate units in the poly(carbonate-ether) polyol was 40%, the catalyst activity was 1.95 Kg/g of the rare earth doped double metal cyanide of $Zn_3[Co(CN)_6]_2$, and the content of the byproduct propylene carbonate in the poly(carbonate-ether)polyol was 4.7% by mass.

EXAMPLE 3

A weighing bottle was subjected to 6 times of treatment of evacuation and inflation with $CO_2$ gas at 80° C., and the weighing bottle was cooled to room temperature. Malonic acid was weighed by using the weighing bottle described above. An autoclave was subjected to 6 times of treatment of evacuating $CO_2$ gas at 80° C., and then cooled to room temperature. 5.4 g of malonic acid was added to the autoclave described above, and 100 mL of propylene oxide was added to the autoclave. With stirring at a speed of 500 rpm, the autoclave was placed in a thermostatic bath at 80° C. for performing reaction to obtain an intermediate, wherein the time for the reaction was 130 min.

50 mg of the rare earth doped double metal cyanide of $Zn_3[Co(CN)_6]_2$ produced in Example 1 was added to the autoclave described above, and carbon dioxide was introduced into the autoclave to allow the polymerization reaction between the intermediate and carbon dioxide. The pressure for the polymerization reaction was controlled to be 3 MPa. When the pressure in the autoclave was no longer reduced, the reaction was stopped, and the autoclave was cooled to room temperature. The unreacted monomers and carbon dioxide therein were slowly discharged, and the obtained reaction product was collected and then dried in a vacuum drying oven at 40° C. to constant weight so as to obtain 113 g of a poly(carbonate-ether)polyol.

The time for the polymerization reaction in the process of the method for producing the poly(carbonate-ether)polyol provided in Example 3 of this invention was recorded. As a result of observation, the time for the polymerization reaction in the process of the method for producing the poly(carbonate-ether)polyol provided in Example 3 of this invention was 4 hours.

Figure 2:
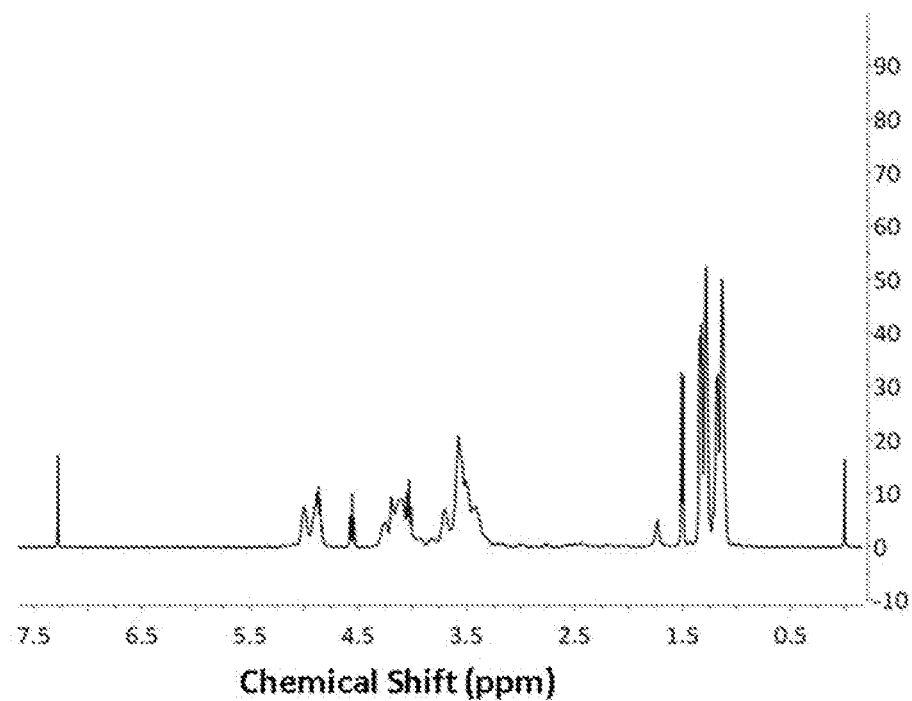
FIG. 2 is a hydrogen nuclear magnetic resonance spectrogram of the poly(carbonate-ether)polyol produced in Example 3 of this invention.

The poly(carbonate-ether)polyol produced in Example 3 of this invention was subjected to a detection of gel permeation chromatography and a detection of nuclear magnetic resonance. The detection results were as shown in FIG. 1 and FIG. 2. FIG. 1 is a chromatogram of gel permeation chromatography of the poly(carbonate-ether)polyol produced in Example 3 of this invention; and FIG. 2 is a hydrogen nuclear magnetic resonance spectrogram of the poly(carbonate-ether)polyol produced in Example 3 of this invention. As can be known from FIG. 1 and FIG. 2, with respect to the poly(carbonate-ether)polyol produced in Example 3 of this invention, the number average molecular weight was 6000 g/mol, the molecular weight distribution was 1.31, the content of carbonate units in the poly(carbonate-ether)polyol was 43%, the catalyst activity was 2.26 Kg/g of the rare earth doped double metal cyanide of $Zn_3[Co(CN)_6]_2$, and the content of the byproduct propylene carbonate in the poly(carbonate-ether)polyol was 8.3% by mass.

EXAMPLE 4

A weighing bottle was subjected to 6 times of treatment of evacuation and inflation with $CO_2$ gas at 80° C., and the weighing bottle was cooled to room temperature. Tartaric acid was weighed by using the weighing bottle described above. An autoclave was subjected to 6 times of treatment of evacuating $CO_2$ gas at 80° C., and then cooled to room temperature. 12 g of tartaric acid was added to the autoclave described above, and 100 mL of cyclohexene oxide was added to the autoclave. With stirring at a speed of 500 rpm, the autoclave was placed in a thermostatic bath at 90° C. for performing reaction to obtain an intermediate, wherein the time for the reaction was 60 min.

40 mg of the rare earth doped double metal cyanide of $Zn_3[Co(CN)_6]_2$ produced in Example 1 was added to the autoclave described above, and carbon dioxide was introduced into the autoclave to allow the polymerization reaction between the intermediate and carbon dioxide. The pressure for the polymerization reaction was controlled to be 5 MPa. When the pressure in the autoclave was no longer reduced, the reaction was stopped, and the autoclave was cooled to room temperature. The unreacted monomers and carbon dioxide therein were slowly discharged, and the obtained reaction product was collected and then dried in a vacuum drying oven at 40° C. to constant weight so as to obtain 104 g of a poly(carbonate-ether)polyol.

The time for the polymerization reaction in the process of the method for producing the poly(carbonate-ether)polyol provided in Example 4 of this invention was recorded. As a result of observation, the time for the polymerization reaction in the process of the method for producing the poly(carbonate-ether)polyol provided in Example 4 of this invention was 5 hours.

The poly(carbonate-ether)polyol produced in Example 4 of this invention was subjected to a detection of gel permeation chromatography and a detection of nuclear magnetic resonance. As results of detections, with respect to the poly(carbonate-ether)polyol produced in Example 4 of this invention, the number average molecular weight was 4500 g/mol, the molecular weight distribution was 1.25, the content of carbonate units in the poly(carbonate-ether)polyol was 67%, the catalyst activity was 2.6 Kg/g of the rare earth doped double metal cyanide of $Zn_3[Co(CN)_6]_2$, and the content of the byproduct propylene carbonate in the poly(carbonate-ether)polyol was 6.4% by mass.

EXAMPLE 5

A weighing bottle was subjected to 6 times of treatment of evacuation and inflation with $CO_2$ gas at 80° C., and the weighing bottle was cooled to room temperature. Aspartic acid was weighed by using the weighing bottle described above. An autoclave was subjected to 6 times of treatment of evacuating $CO_2$ gas at 80° C., and then cooled to room temperature. 4 g of aspartic acid was added to the autoclave described above, and 100 mL of polystyrene oxide was added to the autoclave. With stirring at a speed of 500 rpm, the autoclave was placed in a thermostatic bath at 100° C. for performing reaction to obtain an intermediate, wherein the time for the reaction was 150 min.

45 mg of the rare earth doped double metal cyanide of $Zn_3[Co(CN)_6]_2$ produced in Example 1 was added to the autoclave described above, and carbon dioxide was introduced into the autoclave to allow the polymerization reaction between the intermediate and carbon dioxide. The pressure for the polymerization reaction was controlled to be 2 MPa. When the pressure in the autoclave was no longer reduced, the reaction was stopped, and the autoclave was cooled to room temperature. The unreacted monomers and carbon dioxide therein were slowly discharged, and the obtained reaction product was collected and then dried in a vacuum drying oven at 40° C. to constant weight so as to obtain 87 g of a poly(carbonate-ether)polyol.

The time for the polymerization reaction in the process of the method for producing the poly(carbonate-ether)polyol provided in Example 5 of this invention was recorded. As a result of observation, the time for the polymerization reaction in the process of the method for producing the poly(carbonate-ether)polyol provided in Example 5 of this invention was 6 hours.

The poly(carbonate-ether)polyol produced in Example 5 of this invention was subjected to a detection of gel permeation chromatography and a detection of nuclear magnetic resonance. As results of detections, with respect to the poly(carbonate-ether)polyol produced in Example 5 of this invention, the number average molecular weight was 1200 g/mol, the molecular weight distribution was 1.39, the content of carbonate units in the poly(carbonate-ether)polyol was 37%, the catalyst activity was 1.39 Kg/g of the rare earth doped double metal cyanide of $Zn_3[Co(CN)_6]_2$, and the content of the byproduct propylene carbonate in the poly(carbonate-ether)polyol was 7.8% by mass.

COMPARATIVE EXAMPLE 1

A weighing bottle was subjected to 6 times of treatment of evacuation and inflation with $CO_2$ gas at 80° C., and the weighing bottle was cooled to room temperature. Trifluoroacetic acid was weighed by using the weighing bottle described above. An autoclave was subjected to 6 times of treatment of evacuating $CO_2$ gas at 80° C., and then cooled to room temperature. 8 g of trifluoroacetic acid was added to the autoclave described above, and 60 mg of the rare earth doped double metal cyanide of $Zn_3[Co(CN)_6]_2$ produced in Example 1 and 100 mL of propylene oxide were added to the autoclave. With stirring at a speed of 500 rpm, carbon dioxide was introduced into the autoclave to perform polymerization reaction. The pressure for the polymerization reaction was controlled to be 4 MPa. When the pressure in the autoclave was no longer reduced, the reaction was stopped, and the autoclave was cooled to room temperature. The unreacted monomers and carbon dioxide therein were slowly discharged, and the obtained reaction product was collected and then dried in a vacuum drying oven at 40° C. to constant weight so as to obtain 112 g of a poly(carbonate-ether)polyol.

The time for the polymerization reaction in the process of the method for producing the poly(carbonate-ether)polyol provided in Comparative Example 1 of this invention was recorded. As a result of observation, the time for the polymerization reaction in the process of the method for producing the poly(carbonate-ether)polyol provided in Comparative Example 1 of this invention was 15 hours.

The poly(carbonate-ether)polyol produced in Comparative Example 1 of this invention was subjected to a detection of gel permeation chromatography and a detection of nuclear magnetic resonance. As results of detections, with respect to the poly(carbonate-ether)polyol produced in Comparative Example 1 of this invention, the number average molecular weight was 5000 g/moL, the molecular weight distribution was 1.37, the content of carbonate units in the poly(carbonate-ether)polyol was 39%, the catalyst activity was 1.86 Kg/g of the rare earth doped double metal cyanide of $Zn_3[Co(CN)_6]_2$, and the content of the byproduct propylene carbonate in the poly(carbonate-ether)polyol was 30.3% by mass.

COMPARATIVE EXAMPLE 2

A weighing bottle was subjected to 6 times of treatment of evacuation and inflation with $CO_2$ gas at 80° C., and the weighing bottle was cooled to room temperature. Malonic acid was weighed by using the weighing bottle described above. An autoclave was subjected to 6 times of treatment of evacuating $CO_2$ gas at 80° C., and then cooled to room temperature. 5.4 g of malonic acid was added to the autoclave described above, and 50 mg of the rare earth doped double metal cyanide of $Zn_3[Co(CN)_6]_2$ produced in Example 1 and 100 mL of propylene oxide were added to the autoclave. With stirring at a speed of 500 rpm, carbon dioxide was introduced into the autoclave to perform polymerization reaction. The pressure for the polymerization reaction was controlled to be 3 MPa. When the pressure in the autoclave was no longer reduced, the reaction was stopped, and the autoclave was cooled to room temperature. The unreacted monomers and carbon dioxide therein were slowly discharged, and the obtained reaction product was collected and then dried in a vacuum drying oven at 40° C. to constant weight so as to obtain 104 g of a poly(carbonate-ether)polyol.

The time for the polymerization reaction in the process of the method for producing the poly(carbonate-ether)polyol provided in Comparative Example 2 of this invention was recorded. As a result of observation, the time for the polymerization reaction in the process of the method for producing the poly(carbonate-ether)polyol provided in Comparative Example 2 of this invention was 19 hours.

Figure 3:
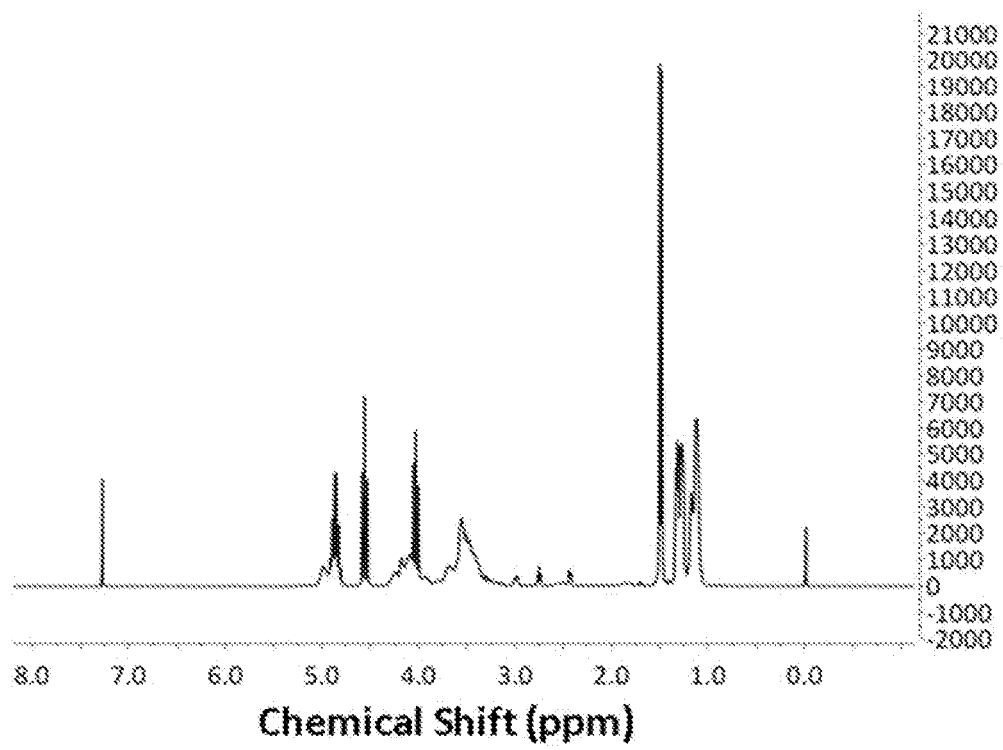
FIG. 3 is a hydrogen nuclear magnetic resonance spectrogram of the poly(carbonate-ether)polyol produced in Comparative Example 2 of this invention.

The poly(carbonate-ether)polyol produced in Comparative Example 2 of this invention was subjected to a detection of nuclear magnetic resonance. The detection result was as shown in FIG. 3. FIG. 3 is a hydrogen nuclear magnetic resonance spectrogram of the poly(carbonate-ether)polyol produced in Comparative Example 2 of this invention. As can be known from FIG. 3, with respect to the poly(carbonate-ether)polyol produced in Comparative Example 2 of this invention, the number average molecular weight was 3900 g/moL, the molecular weight distribution was 1.23, the content of carbonate units in the poly(carbonate-ether)polyol was 39%, the catalyst activity was 1.73 Kg/g of the rare earth doped double metal cyanide of $Zn_3[Co(CN)_6]_2$, and the content of the byproduct propylene carbonate in the poly(carbonate-ether)polyol was 39.4% by mass.

COMPARATIVE EXAMPLE 3

A weighing bottle was subjected to 6 times of treatment of evacuation and inflation with $CO_2$ gas at 80° C., and the weighing bottle was cooled to room temperature. Tartaric acid was weighed by using the weighing bottle described above. An autoclave was subjected to 6 times of treatment of evacuating $CO_2$ gas at 80° C., and then cooled to room temperature. 12 g of tartaric acid was added to the autoclave described above, and 40 mg of rare earth doped double metal cyanide of $Zn_3[Co(CN)_6]_2$ produced in Example 1 and 100 mL of cyclohexene oxide were added to the autoclave. With stirring at a speed of 500 rpm, carbon dioxide was introduced into the autoclave to perform polymerization reaction. The pressure for the polymerization reaction was controlled to be 5 MPa. When the pressure in the autoclave was no longer reduced, the reaction was stopped, and the autoclave was cooled to room temperature. The unreacted monomers and carbon dioxide therein were slowly discharged, and the obtained reaction product was collected and then dried in a vacuum drying oven at 40° C. to constant weight so as to obtain 95 g of a poly(carbonate-ether)polyol.

The time for the polymerization reaction in the process of the method for producing the poly(carbonate-ether)polyol provided in Comparative Example 3 of this invention was recorded. As a result of observation, the time for the polymerization reaction in the process of the method for producing the poly(carbonate-ether)polyol provided in Comparative Example 3 of this invention was 10 hours.

The poly(carbonate-ether)polyol produced in Comparative Example 3 of this invention was subjected to a detection of gel permeation chromatography and a detection of nuclear magnetic resonance. As results of detections, with respect to the poly(carbonate-ether)polyol produced in Comparative Example 3 of this invention, the number average molecular weight was 4700 g/moL, the molecular weight distribution was 1.31, the content of carbonate units in the poly(carbonate-ether)polyol was 59%, the catalyst activity was 2.37 Kg/g of the rare earth doped double metal cyanide of $Zn_3[Co(CN)_6]_2$, and the content of the byproduct propylene carbonate in the poly(carbonate-ether)polyol was 25.6% by mass.

COMPARATIVE EXAMPLE 4

A weighing bottle was subjected to 6 times of treatment of evacuation and inflation with $CO_2$ gas at 80° C., and the weighing bottle was cooled to room temperature. Aspartic acid was weighed by using the weighing bottle described above. An autoclave was subjected to 6 times of treatment of evacuating $CO_2$ gas at 80° C., and then cooled to room temperature. 4 g of aspartic acid was added to the autoclave described above, and 45 mg of the rare earth doped double metal cyanide of $Zn_3[Co(CN)_6]_2$ produced in Example 1 and 100 mL of polystyrene oxide were added to the autoclave. With stirring at a speed of 500 rpm, carbon dioxide was introduced into the autoclave to perform polymerization reaction. The pressure for the polymerization reaction was controlled to be 2 MPa. When the pressure in the autoclave was no longer reduced, the reaction was stopped, and the autoclave was cooled to room temperature. The unreacted monomers and carbon dioxide therein were slowly discharged, and the obtained reaction product was collected and then dried in a vacuum drying oven at 40° C. to constant weight so as to obtain 89 g of a poly(carbonate-ether)polyol.

The time for the polymerization reaction in the process of the method for producing the poly(carbonate-ether)polyol provided in Comparative Example 4 of this invention was recorded. As a result of observation, the time for the polymerization reaction in the process of the method for producing the poly(carbonate-ether)polyol provided in Comparative Example 4 of this invention was 17 hours.

The poly(carbonate-ether)polyol produced in Comparative Example 4 of this invention was subjected to a detection of gel permeation chromatography and a detection of nuclear magnetic resonance. As results of detections, with respect to the poly(carbonate-ether)polyol produced in Comparative Example 4 of this invention, the number average molecular weight was 12000 g/moL, the molecular weight distribution was 1.41, the content of carbonate units in the poly(carbonate-ether)polyol was 38%, the catalyst activity was 1.98 Kg/g of the rare earth doped double metal cyanide of $Zn_3[Co(CN)_6]_2$, and the content of the byproduct propylene carbonate in the poly(carbonate-ether)polyol was 22.6% by mass.

As can be known from the above Examples, this invention provides a production method of a poly(carbonate-ether)polyol, comprising the steps of: performing a reaction between a carboxylic acid and an epoxide to obtain an intermediate, wherein the carboxylic acid has an acidity constant of 0.2 to 4; and performing a polymerization reaction between the intermediate and carbon dioxide under the action of a rare earth doped double metal cyanide of $Zn_3[Co(CN)_6]_2$ to obtain a poly(carbonate-ether)polyol, wherein the rare earth doped double metal cyanide of $Zn_3[Co(CN)_6]_2$ is produced from a rare earth salt compound, a zinc salt compound, $K_3[Co(CN)_6]$, and tert-butanol. In the production method of the poly(carbonate-ether)polyol provided by this invention, a carboxylic acid having a acidity constant of 0.2 to 4 is used as an initiator and an epoxide is firstly activated by using the carboxylic acid, and polyethers having different molecular weights generated in situ after the activation are used as a chain transfer agent to be involved in the polymerization reaction between carbon dioxide and the epoxide under the action of a rare earth doped double metal cyanide of $Zn_3[Co(CN)_6]_2$ to produce a polycarbonate. The epoxide is firstly activated by using the carboxylic acid having a suitable acidity constant, wherein the interaction between the carboxylic acid and the active center of the rare earth doped double metal cyanide of $Zn_3[Co(CN)_6]_2$ is relatively weak, and is directly involved in copolymerization in the form of a chain transfer agent after activation, such that the induction period of the polymerization reaction is relatively short and the time for the polymerization reaction is thereby reduced. Furthermore, after the preliminary activation of the carboxylic acid having a suitable acidity constant and the epoxide, hydrogen protons in the carboxylic acid will not substitute the growing polymer chain from the active center so as to catalyze the back-biting reaction and thus the generation of the byproduct propylene carbonate can be reduced. Therefore, by activating the carboxylic acid and the epoxide via a preliminary reaction, the production method of the poly(carbonate-ether)polyol provided by this invention has a relatively short reaction time, and the content of the byproduct propylene carbonate in the poly(carbonate-ether)polyol produced is relatively low.

What is claimed is:

1. A production method of a poly(carbonate-ether)polyol, comprising the steps of:
performing a reaction between a carboxylic acid and an epoxide to obtain an intermediate, wherein the carboxylic acid has an acidity constant of 0.2 to 4; and
performing a polymerization reaction between the intermediate and carbon dioxide under the action of a rare earth doped double metal cyanide of $Zn_3[Co(CN)_6]_2$ to obtain a poly(carbonate-ether)polyol,
wherein the rare earth doped double metal cyanide of $Zn_3[Co(CN)_6]_2$ is produced from a rare earth salt compound, a zinc salt compound, $K_3[Co(CN)_6]$, and tert-butanol.

2. The method according to claim 1, wherein the acidity constant of the carboxylic acid is 1 to 3.

3. The method according to claim 1, wherein the epoxide comprises one or more selected from the group of alkylene oxide compounds, cycloalkylene oxide compounds, and epoxy ether compounds having a carbon atom number of 2 to 20.

4. The method according to claim 3, wherein the epoxide comprises one or more selected from the group of propylene oxide, ethylene oxide, butylene oxide, polystyrene oxide, cyclopentene oxide, cyclohexene oxide, epoxy chloropropane, glycidyl ether, 1,2-butylene oxide, 1,2-hexene oxide, 1,2-octene oxide, 1,2-decene oxide, 1,2-dodecene oxide, 1,2-tetradecene oxide, and 1,2-hexadecene oxide.

5. The method according to claim 1, wherein the reaction between the carboxylic acid and the epoxide is performed at a temperature of 40° C. to 150° C.

6. The method according to claim 1, wherein the reaction between the carboxylic acid and the epoxide is performed for a time of t, wherein $0<t\leq 200$ min.

7. The method according to claim 1, wherein a mass ratio of the carboxylic acid to the epoxide is 1:(10 to 30).

8. The method according to claim 1, wherein the polymerization reaction is performed under a pressure of 2 MPa to 5 MPa.

9. The method according to claim 8, wherein the pressure for the polymerization reaction is controlled by adjusting the usage amount of carbon dioxide.

10. The method according to claim 1, wherein the polymerization reaction is performed at a temperature of 20° C.-120° C.

11. The method according to claim 1, wherein a mass ratio of the rare earth doped double metal cyanide of $Zn_3[Co(CN)_6]_2$ to the epoxide is 1:(1300 to 2500).

12. The method according to claim 1, wherein the carboxylic acid comprises one or more selected from the group of trifluoroacetic acid, oxalic acid, 2-propiolic acid, maleic acid, phosphoric acid, 1,3,5-benzenetricarboxylic acid, pyruvic acid, malonic acid, monochloroacetic acid, monobromoacetic acid, phthalic acid, salicylic acid, tartaric acid, monoiodoacetic acid, nitrous acid, and aspartic acid.

13. The method according to claim 1, wherein the polymerization reaction is performed for a time of 4 hours to 6 hours.

14. The method according to claim 1, wherein the produced poly(carbonate-ether)polyol comprises a byproduct propylene carbonate having a content of 4.7% to 8.3% by mass.

* * * * *